US011959540B2

(12) United States Patent
Sieber (10) Patent No.: US 11,959,540 B2
(45) Date of Patent: Apr. 16, 2024

(54) BELT PULLEY DECOUPLER WITH AXIAL TOOTHING ON BOTH SIDES AND AUXILIARY UNIT DRIVE

(71) Applicant: Schaeffler Technologies AG & Co. KG, Herzogenaurach (DE)

(72) Inventor: Dimitri Sieber, Ettlingen (DE)

(73) Assignee: Schaeffler Technologies AG & CO. KG, Herzogenaurach (DE)

( * ) Notice: Subject to any disclaimer, the term of this patent is extended or adjusted under 35 U.S.C. 154(b) by 222 days.

(21) Appl. No.: 17/612,587

(22) PCT Filed: Mar. 25, 2020

(86) PCT No.: PCT/DE2020/100234
§ 371 (c)(1),
(2) Date: Nov. 19, 2021

(87) PCT Pub. No.: WO2020/233734
PCT Pub. Date: Nov. 26, 2020

(65) Prior Publication Data
US 2022/0235858 A1 Jul. 28, 2022

(30) Foreign Application Priority Data
May 21, 2019 (DE) ...................... 10 2019 113 443.9

(51) Int. Cl.
*F16H 55/36* (2006.01)
*F02B 67/06* (2006.01)
*F16D 1/076* (2006.01)
*F16D 3/12* (2006.01)

(52) U.S. Cl.
CPC ............. *F16H 55/36* (2013.01); *F16D 1/076* (2013.01); *F02B 67/06* (2013.01); *F16D 3/12* (2013.01); *F16H 2055/366* (2013.01)

(58) Field of Classification Search
CPC . F16H 55/36; F16H 55/14; F16H 7/02; F16H 2055/366
USPC ....................................... 474/94, 70
See application file for complete search history.

(56) References Cited

U.S. PATENT DOCUMENTS

| | | | | |
|---|---|---|---|---|
| 5,988,015 A | * | 11/1999 | Riu ......................... | F16H 55/36 74/574.2 |
| 7,591,357 B2 | * | 9/2009 | Antchak ................. | F16F 15/12 192/81 C |
| 7,892,124 B2 | * | 2/2011 | Hodjat ..................... | F16D 3/12 192/55.2 |
| 8,632,431 B2 | * | 1/2014 | Pflug ...................... | F16H 55/36 474/94 |

(Continued)

FOREIGN PATENT DOCUMENTS

| CN | 1668859 A | 9/2005 |
|---|---|---|
| DE | 102008064341 A1 | 7/2010 |

(Continued)

*Primary Examiner* — Henry Y Liu (57) ABSTRACT

A belt pulley decoupler is provided which is to be arranged on a crankshaft of an internal combustion engine and has a hub provided for coupling to the crankshaft, and a connecting flange of which a distal face is in abutment with the hub in order to transmit torque from the hub to a belt pulley. The connecting flange having a geometry to facilitate a form fit for torque transmission both on the distal face and also on a proximal face which is intended to come into contact with a torsional vibration damper.

17 Claims, 5 Drawing Sheets

(56) References Cited

U.S. PATENT DOCUMENTS

| | | | | |
|---|---|---|---|---|
| 2008/0312014 A1* | 12/2008 | Stief | ................... | F16F 15/123 |
| | | | | 474/94 |
| 2010/0099527 A1* | 4/2010 | Rolando | ............ | F16F 15/1442 |
| | | | | 474/94 |
| 2011/0263365 A1* | 10/2011 | Mende | ............... | F16F 15/1297 |
| | | | | 474/94 |
| 2015/0024885 A1* | 1/2015 | Odenmarck | ............. | F16D 3/84 |
| | | | | 474/94 |
| 2015/0141182 A1* | 5/2015 | Mandel | .................. | F16H 55/36 |
| | | | | 474/94 |
| 2015/0260233 A1* | 9/2015 | Boyes | .............. | F16F 15/12333 |
| | | | | 474/94 |
| 2015/0316138 A1* | 11/2015 | Dell | ....................... | F16H 55/36 |
| | | | | 474/94 |
| 2016/0123453 A1* | 5/2016 | Starodoubov | ............ | F16H 7/18 |
| | | | | 474/94 |
| 2016/0138699 A1* | 5/2016 | Dell | ......................... | F16F 1/12 |
| | | | | 267/168 |
| 2016/0146328 A1* | 5/2016 | Dell | ...................... | B60K 25/02 |
| | | | | 474/94 |

FOREIGN PATENT DOCUMENTS

| | | |
|---|---|---|
| DE | 102014005680 A1 | 10/2015 |
| DE | 102017003156 A1 | 10/2018 |
| DE | 102017115466 A1 | 1/2019 |
| WO | 2014186876 A1 | 11/2014 |
| WO | 2017174070 A1 | 10/2017 |

\* cited by examiner

BELT PULLEY DECOUPLER WITH AXIAL TOOTHING ON BOTH SIDES AND AUXILIARY UNIT DRIVE

CROSS-REFERENCE TO RELATED APPLICATIONS

This application is the U.S. National Phase of PCT Appln. No. PCT/DE2020/100234 filed Mar. 25, 2020, which claims priority to DE 102019113443.9 filed May 21, 2019, the entire disclosures of which are incorporated by reference herein.

TECHNICAL FIELD

The disclosure relates to a belt pulley decoupler for arrangement on a crankshaft of an internal combustion engine having a hub, which is provided for coupling to the crankshaft, and a connecting flange, which is in abutment with the hub with a distal face to generate torque from the hub (for example via a spring) to be transmitted to a belt pulley body. The disclosure further relates to an auxiliary unit drive for a motor vehicle having an internal combustion engine and a belt pulley decoupler according to the disclosure.

BACKGROUND

Belt pulley decouplers or torsional vibration dampers with Hirth toothings are already known from the prior art. In particular, the generic DE 10 2008 064 341 B4 discloses a belt pulley for a belt drive having a hub, a belt pulley ring with at least one circumferential groove for a belt of the belt drive, a torsional vibration damper, and an overrunning clutch arranged between the hub and the belt pulley ring. Complementary Hirth toothings are formed on the hub and on an end section of a crankshaft of an internal combustion engine.

The generic DE 10 2017 115 466 A1 also discloses a belt pulley decoupler for arrangement on a crankshaft of an internal combustion engine, having a hub which is intended to be coupled to the crankshaft in a rotationally fixed manner, and a flange element arranged at least partially radially outside of the hub on which a torque introduced from the crankshaft to the hub can be transmitted, and which is provided for least partially transmitting the introduced torque to a belt pulley body with the interposition of a bow spring, wherein the flange element has an inner flange section and an outer flange section configured separately therefrom. In this case, a wave or ramp shape running at least in sections in the circumferential direction of the outer flange section in the manner of an axially acting spur toothing, in particular as a Hirth toothing, can be formed on the outer flange section.

However, the prior art still has the disadvantage that increasing torques to be transmitted result in a change in the screw connections on the belt pulley decoupler, which in turn entails additional costs due to design measures. As an alternative to changing the screw connection, secondary measures associated with additional costs, such as coatings that increase the coefficient of friction, friction foils or diamond foils, etc., are usually used

SUMMARY

It is therefore the object of the disclosure to avoid or at least to mitigate the disadvantages of the prior art. In particular, a cost-neutral secondary measure is to be provided for the transmission of higher torques in belt pulley decouplers.

This object is achieved according to the disclosure with a generic component in that the connecting flange has a geometry to facilitate a form fit for torque transmission on both the distal face and a proximal face (opposite the distal face), which is intended to come into contact with a torsional vibration damper.

This has the advantage that, compared with a simple frictional connection between two components, in particular the hub and the connecting flange, higher torques can be transmitted if these two components are designed in a form-fitting manner by means of the geometry according to the disclosure which facilitates a form fit.

Advantageous embodiments are claimed in the dependent claims and are explained below.

In a preferred embodiment, the hub can have a geometry on the two end faces thereof to facilitate a torque-transmitting form fit between the crankshaft and the hub on the one hand and the hub and the connecting flange on the other hand. This means that higher torques can also be transmitted between the hub and crankshaft without impairing the operational reliability of the belt pulley decoupler.

According to the disclosure, the geometries that facilitate a form fit can be designed in the same way (and in particular identical) on the two end faces of the connecting flange and the hub. The geometry that facilitates a form fit can preferably be designed as a toothing, in particular as an axial toothing, preferably as a Hirth toothing, so that the two components are centered on one another in addition to increasing the transmittable torque.

In a further embodiment, the torsional vibration damper can be designed with a geometry that is opposite to the hub facing away from the end face of the connecting flange, to force a connection without play and thus ensure safe operation even at high torques.

Preferably, the geometry that facilitates a form fit can be attached by tooling, for example by punching, forging, injection molding, or by machining. For this reason, no further processing steps, in particular cost-intensive secondary measures, are necessary to ensure operational reliability at high torques after the production of the geometry that facilitates a form fit.

According to the disclosure, gaps in a toothing can lie approximately or exactly below the tips of the further toothing on the same component, which makes it possible to apply a toothing according to the disclosure on both sides even with very thin components. In other words, according to the disclosure, a component can be designed in such a way that tooth flanks of a first toothing on one end face of the component are essentially parallel and at a constant distance from tooth flanks of a second toothing on the other end face of the component.

In a belt pulley decoupler according to the disclosure, forces between components, including the hub, the connecting flange and the torsional vibration damper can be transmitted exclusively or predominantly at the interfaces of the components via a form fit during operation.

In a further embodiment, a second torsional vibration damper can be connected in a form-fitting manner by means of a geometry that facilitates a form fit to an end face of the hub facing away from the torsional vibration damper. In this case, the second torsional vibration damper can also have, on the end face thereof facing away from the hub, a shape-locking geometry for connection to the crankshaft. The two geometries of the second torsional vibration damper that facilitate a form fit can preferably be designed as axial toothings in the form of a Hirth toothing, which allows a high torque and at the same time (automatically) ensures centering of the second torsional vibration damper. In other words, in a further embodiment, a second torsional vibration damper can be interposed between the hub and the crankshaft of the internal combustion engine, wherein the connection between the second torsional vibration damper and the hub or the crankshaft is implemented in a form-fitting manner via a Hirth toothing.

In other words, the disclosure relates to a proposed double-sided Hirth toothing in a belt pulley decoupler. This toothing is attached on both sides of the connecting flange, the hub and/or on another component and creates form fits between the components. In this way, the torque is positively transmitted through all components. The production of the toothing can be produced by tooling, by punching, forging, injection molding, etc., or also by machining. When producing thin components, e.g., from sheet metal, the toothing can be attached twisted so that the gaps in the rear toothing are exactly below the tips of the front toothing. Another advantage is the additional centering through the Hirth toothing.

BRIEF DESCRIPTION OF THE DRAWINGS

The disclosure is explained below with the aid of drawings. In the figures.

The figures are only schematic in nature and serve only for understanding the disclosure. The same elements are provided with the same reference numbers. The features of the exemplary embodiments can be interchanged.

DETAILED DESCRIPTION

Figure 1:
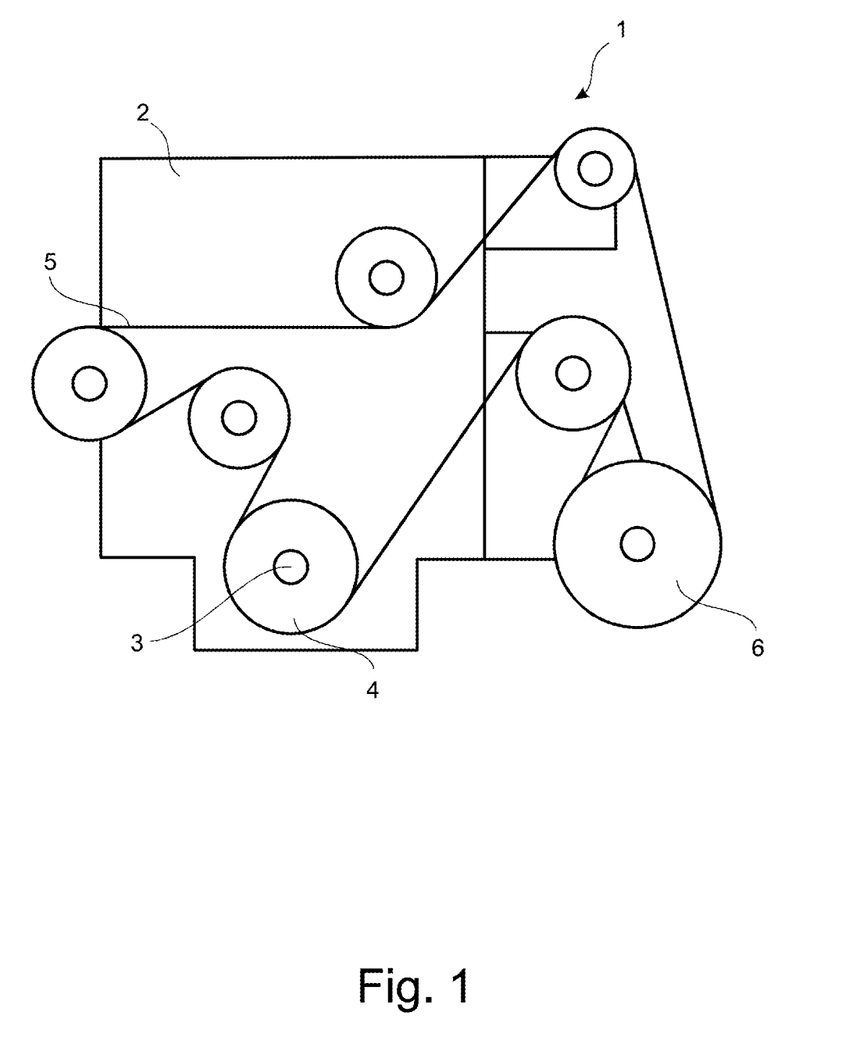
FIG. 1 shows a schematic arrangement of an auxiliary unit drive known from the prior art of an internal combustion engine having a belt pulley decoupler.
Figure 2:
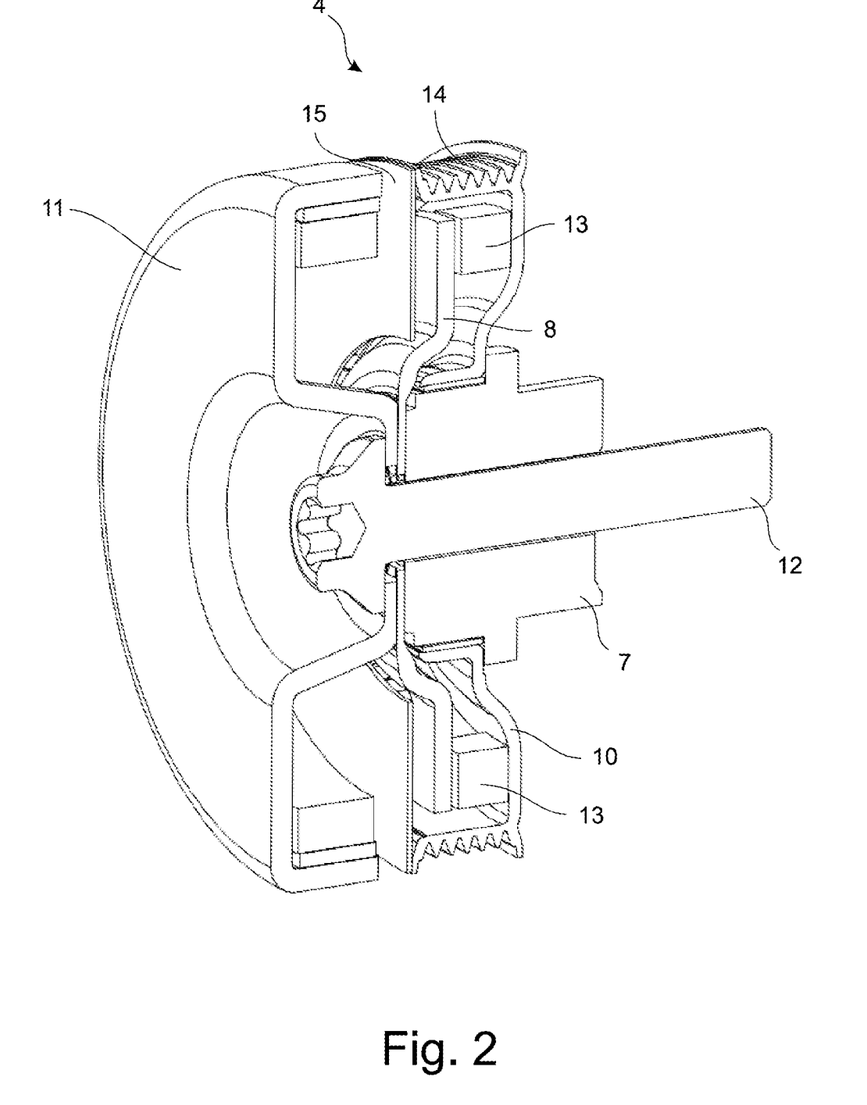
FIG. 2 shows a perspective sectional view of a belt pulley decoupler according to a preferred exemplary embodiment.

FIG. 1 schematically shows an arrangement of an auxiliary unit drive 1 of a vehicle having an internal combustion engine 2. A crankshaft 3 of the internal combustion engine 2 is rotatably coupled to a belt pulley decoupler 4, which transmits the torque of the internal combustion engine 2 to an endless traction means 5, e.g., in the form of a belt or a chain, so that auxiliary units 6 are driven when the crankshaft 3 rotates. As auxiliary units 6 can be arranged on the internal combustion engine 2, for example, an alternator or an electric motor to assist when restarting the internal combustion engine 2 in a start-stop mode, FIG. 2 shows the belt pulley decoupler 4, which is arranged on the crankshaft 3 of the internal combustion engine 2. In the preferred exemplary embodiment, the belt pulley decoupler 4 has a hub 7 which is rotatably coupled to the crankshaft 3, a connecting flange 8 to which a torque introduced from the crankshaft 3 can be transmitted to the hub 2, and which, with the interposition of at least one bow spring 9, at least partially transmits introduced torque to a belt pulley body/belt pulley 10. Furthermore, a torsional vibration damper 11 is arranged on the belt pulley decoupler 4. As can be seen in FIG. 2, the hub 7, the connecting flange 8, and the torsional vibration damper 11 are arranged to be coaxial in this order away from the crankshaft 3 and opposed by a screw 12 which engages with an internal thread formed in the crankshaft 3 to clamp/secure the crankshaft 3.

During operation of the internal combustion engine 2, the hub 7 rotates at a speed specified by the crankshaft 3 and transmits this and the torque of the internal combustion engine 2 to the connecting flange 8. The connecting flange 8 driven in this way is in turn in torque-transmitting contact with the at least one bow spring 9, which is coupled to the belt pulley body 10 via corresponding projections 13. The belt pulley body 10 forms a pulley 14 which is designed to come into contact with the endless traction means 5. To compensate for rotational irregularities, that is, to increase the smoothness of the belt pulley decoupler 4 and at least partially decouple it from impacts in the crankshaft 3, the torsional vibration damper 11 is also connected to the hub 7, as described above.

The torque that is generated by combustion in the internal combustion engine 2 can thus be transmitted via the crankshaft 3, the hub 7, the connecting flange 8, and the bow spring 9 to the belt pulley body 10 and finally to the endless traction means 5. In the preferred exemplary embodiment, the endless traction means 5 serves, as described above, to drive the auxiliary units 6 of the vehicle in which the internal combustion engine 2 is mounted, e.g., such as an alternator or the like.

In other words, the torque of the internal combustion engine 2 is along a first power flow path from the crankshaft 3 to the hub 7, from the hub 7 to the connecting flange 8, from the connecting flange 8 to the at least one bow spring 9, and from the bow spring 9 to the belt pulley body 10 and passed on to the auxiliary unit drive/belt drive 1. The torque of the internal combustion engine 2 for vibration damping is transmitted along a second power flow path from the crankshaft 3 to the hub 7, from the hub 7 to the connecting flange 8, and then from the connecting flange 8 to the torsional vibration damper 11.

Figure 3:
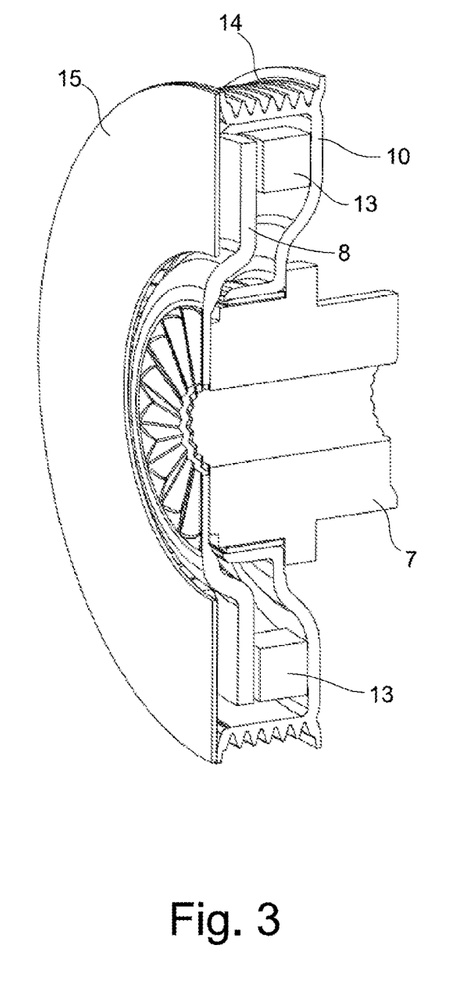
FIG. 3 shows a further sectional view of the belt pulley decoupler according to the preferred exemplary embodiment without torsional vibration damper and screw.
Figure 4:
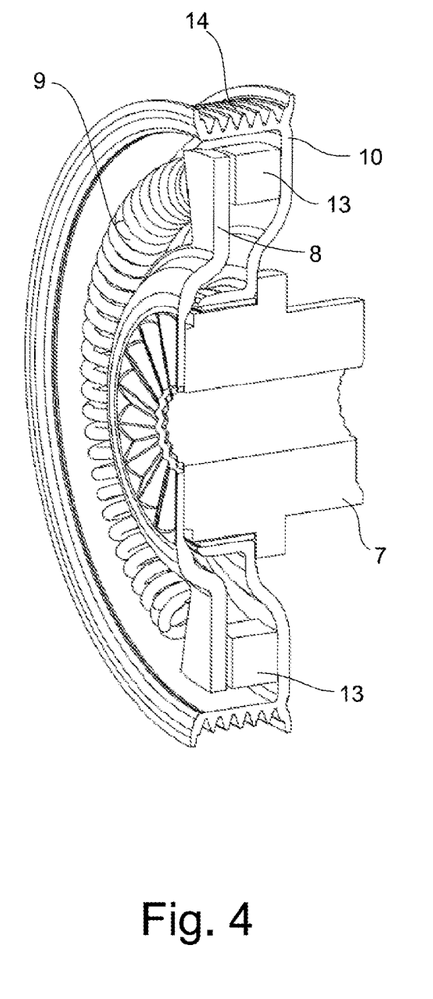
FIG. 4 shows yet another sectional view of the belt pulley decoupler according to the preferred exemplary embodiment without a cover and connecting flange.

As can be seen in FIGS. 3 and 4, a cover 15 is arranged on the belt pulley body 10 on the torsional vibration damper side. This holds the at least one bow spring 9 in a cavity formed between cover 15 and belt pulley body 10. In the preferred exemplary embodiment are formed for coupling the connecting flange 8 to the belt pulley body 10 two projections 13 on the latter, between each of which is arranged a bow spring 9.

Figure 5:
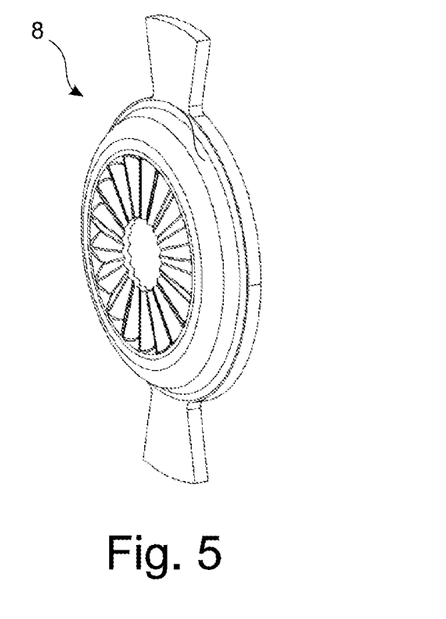
FIGS. 5 and 6 show perspective views of a connecting flange of the belt pulley decoupler according to the preferred exemplary embodiment.
Figure 6:
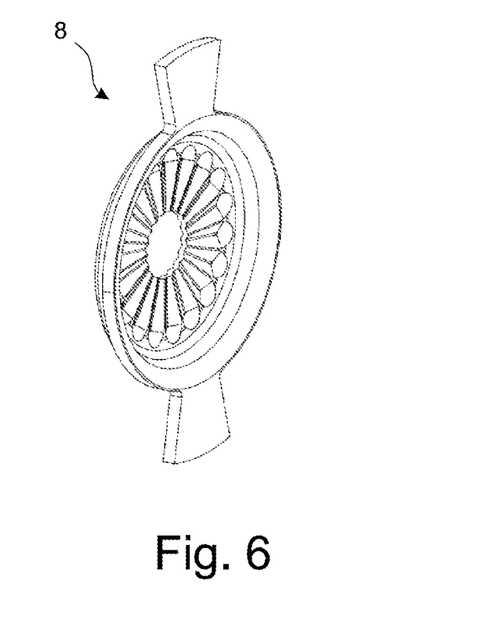

FIGS. 5 and 6 each show perspective views of the connecting flange 8. In the preferred exemplary embodiment, the connecting flange 8 has an essentially disk-shaped base body from which two opposing, plate-shaped tongues stick out/protrude in the radial direction. Furthermore, an axial spur toothing (axial toothing) in the form of a Hirth toothing is formed on the base body of the connecting flange 8 both on the torsional vibration damper-side end section/ end face thereof and on the hub-side end section/end face thereof, which are each in engagement with a complementary spur toothing on the torsional vibration damper 11 or on the hub 7, as can be seen in FIG. 8.

In the preferred exemplary embodiment, the two spur toothings of the connecting flange 8 are designed in such a way that the tooth flanks of the one spur toothing are arranged to be parallel at a constant distance from the tooth flanks of the second spur toothing. Thus, the connecting flange 8 can be designed with a small material thickness without impairing the transmittable torque.

In other words, the two spur toothings of the connecting flange 8 are designed to be rotated with respect to one another, so that the tooth gaps of the one toothing are arranged in the axial direction exactly behind the tooth tips of the second toothing.

Figure 7:
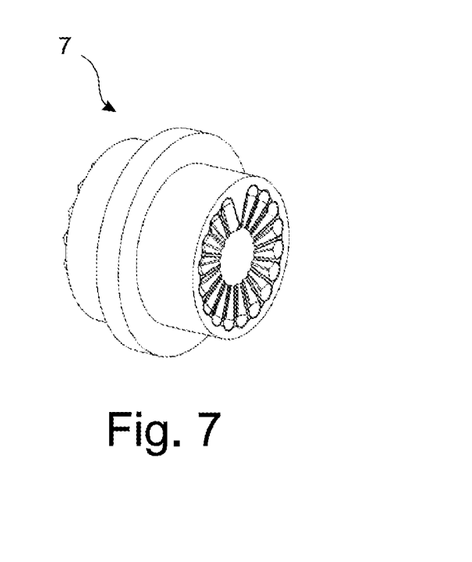
FIGS. 7 and 8 show perspective views of a hub of the belt pulley decoupler according to the preferred exemplary embodiment.
Figure 8:
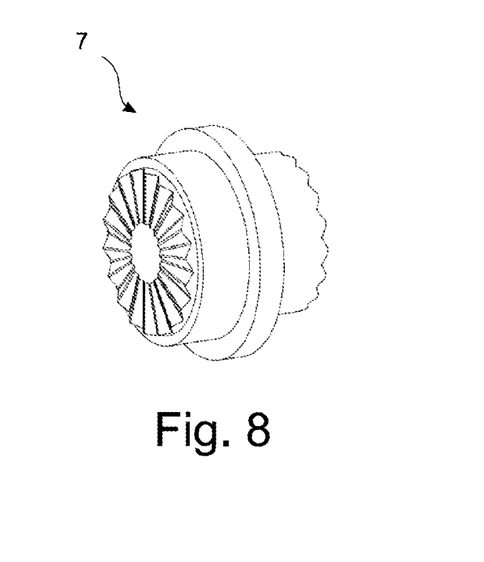

Perspective views of the hub 7 are shown in FIG. 7 and FIG. 8. In the preferred exemplary embodiment, similar to the connecting flange 8, in addition to the spur toothing which is in engagement with the connecting flange 8, on the end section/face on the connecting flange side, an axial spur toothing in the form of a Hirth toothing is also formed on the crankshaft-side end section/face on the hub 7 which in turn meshes with a complementary axial spur toothing on the crankshaft 3. A circumferential projection is formed on a central section of the hub 7, which as can be seen in FIG. 2 serves as an axial stop for the belt pulley body 10 in an assembled state of the belt pulley decoupler 4.

The form fit connections between hub 7 and connecting flange 8 and between connecting flange 8 and torsional vibration damper 11, and between hub 7 and crankshaft 3 ensure safe operation even with higher torques to be transmitted, without needing to provide additional cost-intensive secondary measures. In addition, the crankshaft 3, the hub 7, the connecting flange 8, and the torsional vibration damper 11 are centered with respect to one another via the spur toothings.

Figure 9:
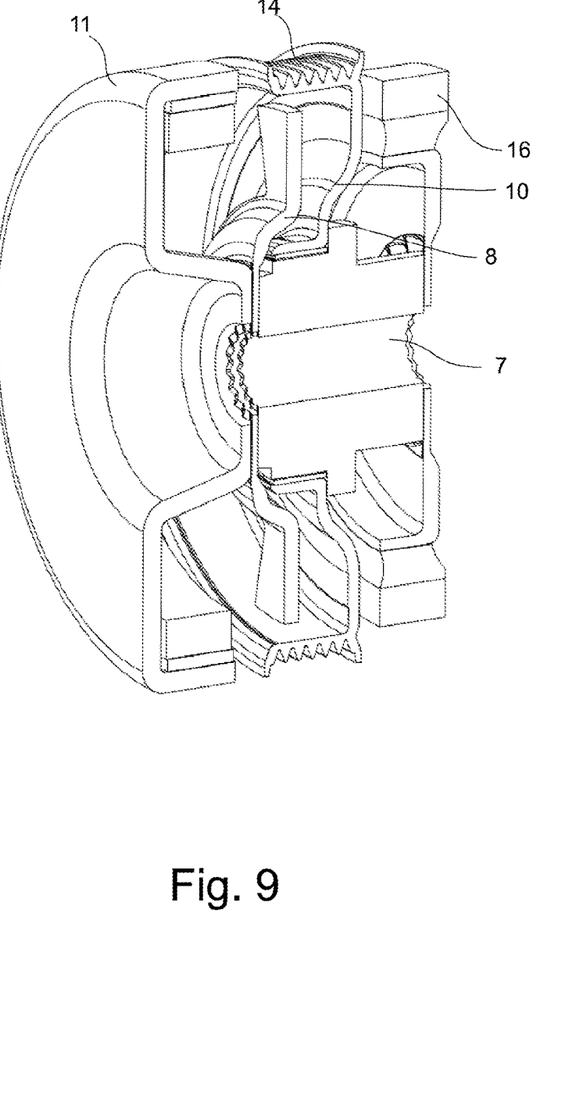
FIG. 9 shows a perspective sectional view of a belt pulley decoupler according to a modified exemplary embodiment.
Figure 10:
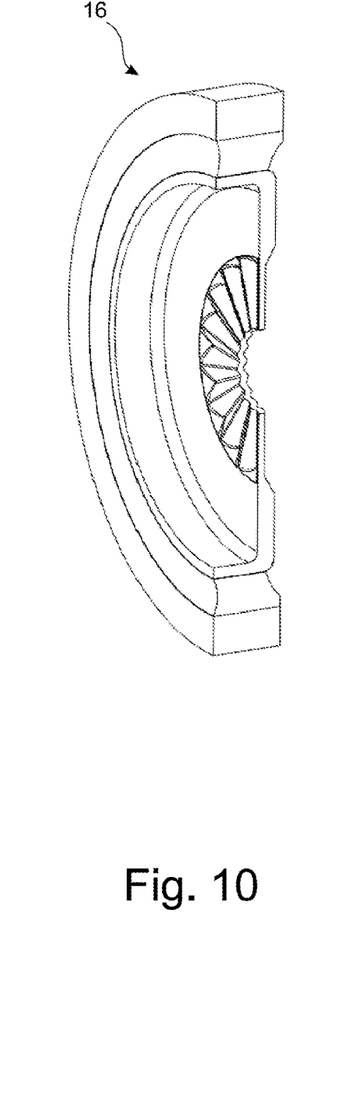
FIG. 10 shows a perspective sectional view of a second torsional vibration damper of the belt pulley decoupler according to the modified exemplary embodiment.

FIG. 9 shows a perspective sectional view of a belt pulley decoupler 4 according to a modified exemplary embodiment. The structure of the belt pulley decoupler 4 is analogous to the preferred exemplary embodiment. To simplify the illustration, the cover 15, the screw 12 and the bow spring 9 are omitted in FIG. 10. In the belt pulley decoupler 4 according to the modified exemplary embodiment, a second torsional vibration damper 16 is arranged between the hub 7 of the belt pulley decoupler 4 and the crankshaft 3 of the internal combustion engine 2. As shown in FIG. 10, the second torsional vibration damper 16 has an axial spur toothing in the form of a Hirth toothing both on the hub-side end section thereof and on the crankshaft-side end section thereof, each of which are engaged with the spur toothing of the hub 7 or the spur toothing of the crankshaft 3.

A belt pulley decoupler 4 according to a preferred exemplary embodiment is described above. It goes without saying, however, that the description is only exemplary and the scope of protection of the disclosure is defined by the claims.

In the preferred exemplary embodiment, the connecting flange 8 is designed with the two mutually opposite tongues. However, only one tongue or a plurality of tongues can be arranged over the circumference of the connecting flange 8.

Furthermore, in the preferred exemplary embodiment, two projections 13 are arranged on the belt pulley body 10, and two bow springs 9 are used in the belt pulley decoupler 4. However, only one projection can be formed and a bow spring can be used. Alternatively, a large number of projections can also be formed with bow springs arranged therebetween.

LIST OF REFERENCE NUMBERS

1 Auxiliary unit drive
 2 Internal combustion engine
 3 Crankshaft
 4 Belt pulley decoupler
 5 Endless traction means
 6 Auxiliary unit
 7 Hub
 8 Connecting flange
 9 Bow spring
 10 Belt pulley body
 11 Torsional vibration damper
 12 Screw
 13 Projection
 14 Belt pulley
 15 Cover
 16 Second torsional vibration damper

The invention claimed is:

1. A belt pulley decoupler for arrangement on a crankshaft of an internal combustion engine comprising: a hub configured for coupling to the crankshaft and a connecting flange of which a distal face is in abutment with the hub to transmit torque from the hub to a belt pulley, wherein the connecting flange has a geometry to facilitate a form fit for torque transmission both on the distal face and also on a proximal face which is arranged to contact a torsional vibration damper, wherein the hub has a geometry on two end faces thereof to facilitate a torque-transmitting form fit between the crankshaft and the hub on one hand and between the hub and the connecting flange on the other hand.

2. The belt pulley decoupler according to claim 1, wherein the geometry on the distal face and the geometry on the end face which facilitates a form fit between the connecting flange and the hub are formed identically.

3. The belt pulley decoupler according to claim 1, wherein the geometry which facilitates a form fit is designed as a toothing.

4. The belt pulley decoupler according to claim 1, wherein the torsional vibration damper is designed with a geometry that facilitates a form fit on the proximal face of the connecting flange facing away from the hub.

5. The belt pulley decoupler according to claim 1, wherein the geometry which facilitates a form fit is attached by punching, forging, injection molding, or machining.

6. The belt pulley decoupler according to claim 3, wherein gaps in the toothing lie approximately below tips of a further toothing on the same component.

7. The belt pulley decoupler according to claim 4, wherein forces between the hub, the connecting flange and the torsional vibration damper are transferable during operation via a form fit exclusively at interfaces of the hub, the connecting flange and the torsional vibration damper.

8. The belt pulley decoupler according to claim 4, wherein a second torsional vibration damper is connected to an end face of the hub facing away from the torsional vibration damper by a geometry that facilitates a form fit.

9. An auxiliary unit drive for a motor vehicle having an internal combustion engine, comprising a belt pulley decoupler according to claim 1.

10. The belt pulley decoupler according to claim 3, wherein the toothing is an axial toothing.

11. The belt pulley decoupler according to claim 3, wherein the toothing is a Hirth toothing.

12. A belt pulley decoupler for arrangement on a crankshaft of an internal combustion engine, comprising:

a hub configured for coupling to the crankshaft, wherein the hub includes axial toothing on first and second end faces, the axial toothing on the first end face configured to facilitate a torque-transmitting form fit between the crankshaft and the hub;

a connecting flange having a distal face in abutment with the second end face of the hub to transmit torque from the hub to a belt pulley, wherein the connecting flange includes axial toothing on the distal face to facilitate a form fit for torque transmission between the connecting flange and the hub; and a first torsional vibration damper arranged to contact a proximal face of the connecting flange, wherein the hub, the connecting flange, and the first torsional vibration damper are arranged to be coaxial in this order away from the crankshaft.

13. The belt pulley decoupler according to claim 12, wherein a second torsional vibration damper is arranged between the hub and the crankshaft, wherein the second torsional vibration damper is connected to the first end face of the hub that faces away from the first torsional vibration damper.

14. The belt pulley decoupler according to claim 12, wherein a circumferential projection is formed on a central section of the hub and configured as an axial stop for the belt pulley.

15. A belt pulley decoupler for arrangement on a crankshaft of an internal combustion engine comprising: a hub configured for coupling to the crankshaft and a connecting flange of which a distal face is in abutment with the hub to transmit torque from the hub to a belt pulley, wherein the connecting flange has a geometry to facilitate a form fit for torque transmission both on the distal face and also on a proximal face which is arranged to contact a torsional vibration damper, wherein the torsional vibration damper is designed with a geometry that facilitates a form fit on the proximal face of the connecting flange facing away from the hub.

16. The belt pulley decoupler according to claim 15, wherein forces between the hub, the connecting flange and the torsional vibration damper are transferable during operation via a form fit exclusively at interfaces of the hub, the connecting flange and the torsional vibration damper.

17. The belt pulley decoupler according to claim 15, wherein a second torsional vibration damper is connected to an end face of the hub facing away from the torsional vibration damper by a geometry that facilitates a form fit.

* * * * *